United States Patent
Paillet et al.

(10) Patent No.: US 7,791,226 B2
(45) Date of Patent: Sep. 7, 2010

(54) BIDIRECTIONAL CONNECTION BETWEEN A DIGITAL CONTROL CIRCUIT AND AN AC SWITCH

(75) Inventors: Pascal Paillet, Saint Cyr sur Loire (FR); Thierry Castagnet, Tours (FR)

(73) Assignee: STMicroelectronics, SA, Montrouge (FR)

( * ) Notice: Subject to any disclaimer, the term of this patent is extended or adjusted under 35 U.S.C. 154(b) by 161 days.

(21) Appl. No.: 12/011,163

(22) Filed: Jan. 24, 2008

(65) Prior Publication Data

US 2008/0179965 A1    Jul. 31, 2008

(30) Foreign Application Priority Data

Jan. 26, 2007   (FR)   .................................. 07 52918

(51) Int. Cl.
*H01H 47/00*   (2006.01)
*H01H 83/00*   (2006.01)
*H02J 7/00*    (2006.01)

(52) U.S. Cl. ..................................................... 307/125
(58) Field of Classification Search ................. 307/125, 307/140

See application file for complete search history.

(56) References Cited

U.S. PATENT DOCUMENTS

| | | | | |
|---|---|---|---|---|
| 4,349,879 A | * | 9/1982 | Peddie et al. ............... 700/295 |
| 5,373,224 A | * | 12/1994 | Rabier et al. ................ 323/244 |
| 6,739,145 B2 | * | 5/2004 | Bhatnagar ..................... 62/127 |
| 2007/0064454 A1 | * | 3/2007 | Chen et al. ..................... 363/49 |

* cited by examiner

*Primary Examiner*—Albert W Paladini
*Assistant Examiner*—Carlos Amaya
(74) *Attorney, Agent, or Firm*—The NOblitt Group, PLLC

(57) ABSTRACT

A method and a circuit for controlling a switch intended to apply an AC signal, by application of a control signal on a terminal of a circuit, at least one signal of information as to the state of the switch or of a load that it controls being provided to said terminal in a time multiplexing with said control signal.

18 Claims, 4 Drawing Sheets

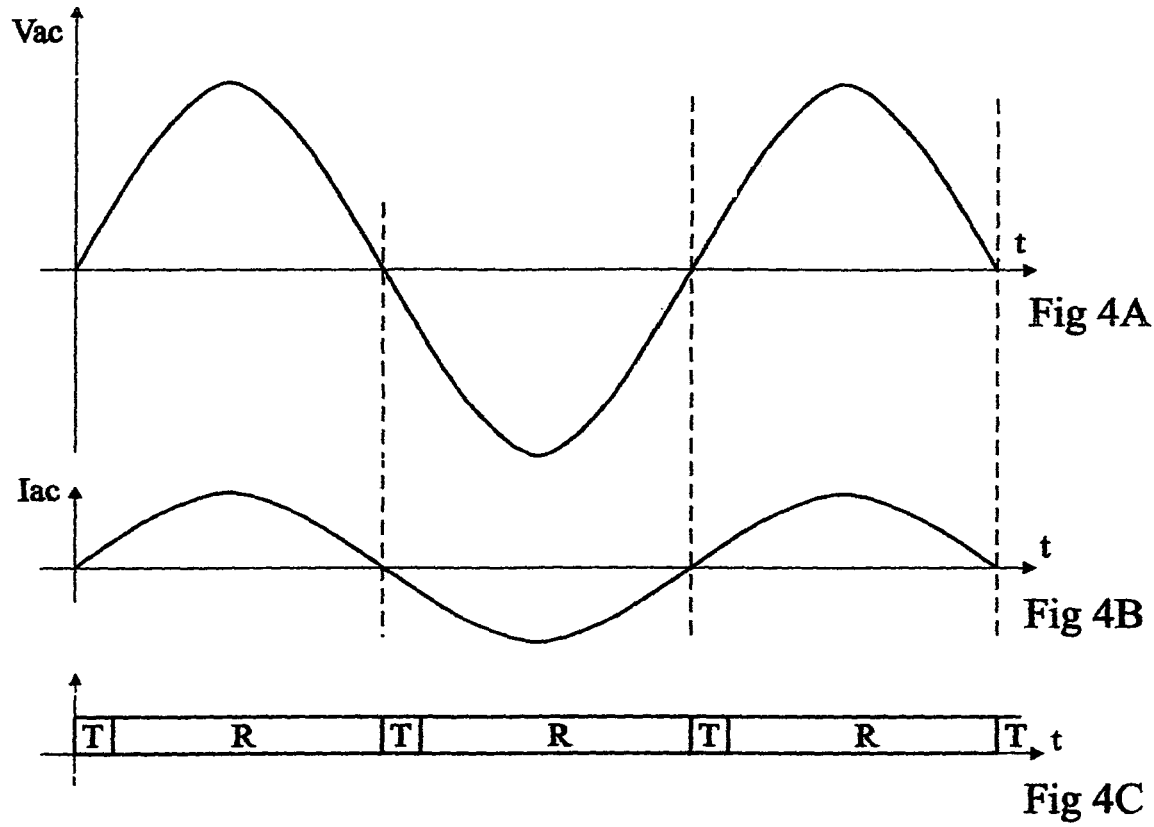
Fig 4A
Fig 4B
Fig 4C
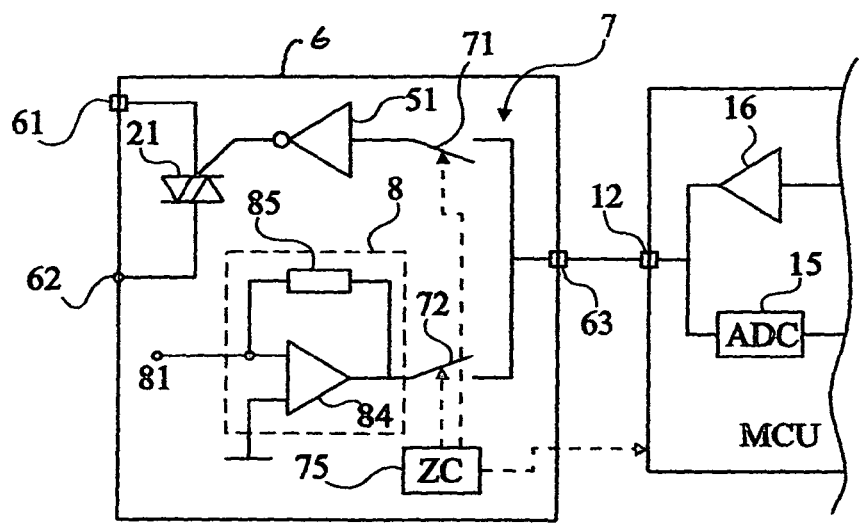
Fig 5

US 7,791,226 B2

BIDIRECTIONAL CONNECTION BETWEEN A DIGITAL CONTROL CIRCUIT AND AN AC SWITCH

BACKGROUND OF THE INVENTION

1. Field of the Invention

The present invention generally relates to AC switches, that is, switches intended to control a load powered by an AC voltage or current and, more specifically, an interface circuit between such a switch and a digital control circuit.

The present invention more specifically applies to the case where information about the AC switch or the load is sent back to the digital control circuit.

2. Discussion of the Related Art

Current solutions for transmitting control signals from a digital circuit to an AC switch, and for transmitting to the digital control circuit information about the load controlled by this switch or about the state of this switch, require at least two communication links with the digital circuit.

Increasingly, a same circuit integrates one or several AC switches connectable to a high-voltage load (for example, powered by the AC electric power system voltage of more than one hundred volts) and their control circuits ("control parts") capable of receiving low-voltage signals (for example, from a few volts to a few tens of volts) originating, for example, from a digital control circuit.

It would be desirable to be able to share the same connection to exchange control and information signals between an AC switch and its control circuit.

U.S. Pat. No. 6,476,709 describes data transmission over an AC power supply line of a load to be cyclically supplied, comprising the organizing of a division of the AC supply voltage according to a coding of the data to be transmitted and outside cyclic load supply periods.

SUMMARY OF THE INVENTION

The present invention aims at overcoming all or part of the undesirable aspects of known techniques of a control interface and for obtaining information between an AC switch and a control circuit.

In accordance with one aspect of the invention, a single-wire bi-directional communication between a circuit integrating the switch and a control circuit is provided.

In accordance with another aspect of the invention, a solution compatible with different types of feedback signals originating from the load or from the switch is provided.

In accordance with a further aspect of the invention a solution integrable with the AC switch is provided.

In accordance with a still further aspect of the invention, a solution compatible with different types of AC switches is provided.

To achieve all or part of these features, as well as others, a method for controlling a switch intended to apply an AC signal, by application of a control signal on a terminal of a circuit, at least one signal of information as to the state of the switch or of a load that it controls being provided to said terminal in a time multiplexing with said control signal, is provided.

According to an embodiment:

the control signal of the switch is applied on said terminal during a first time phase of each half-period of the AC signal; and the information signal is provided to said terminal during a second phase of each half-period of the AC signal.

According to an embodiment, the duration and the position of the first phase is selected according to the switch control signal and/or to the type of load.

According to an embodiment, the first phase starts at the voltage zero of an AC voltage for supplying the load controlled by the switch and ends at a time selected for the current in the switch to be sufficient to maintain it in the on state until the end of the half-period.

According to an embodiment, the information signal is provided to said terminal during time phases when no control signal is applied on this terminal.

According to an embodiment, the range of possible voltages of the information signal is selected to be below a minimum level of the signal for controlling the switch.

The present invention also provides a circuit of interface between at least one switch intended to apply an AC signal and a control circuit, comprising at least one time multiplexing circuit between a control signal of the switch and at least one information signal intended for the control circuit.

According to an embodiment, the multiplexing circuit comprises at least one element for comparing the voltage present on said terminal with a threshold beyond which the control signal is transmitted to the switch.

According to an embodiment, the multiplexing circuit comprises a circuit for biasing said terminal to a level lower than said threshold.

According to an embodiment, at least one information provision circuit is capable of, in the active state, lowering the biasing level of said terminal.

The present invention also provides a circuit for controlling a load to be supplied with an AC voltage.

The foregoing and other aspects of the present invention will be discussed in detail in the following non-limiting description of specific embodiments in connection with the accompanying drawings.

BRIEF DESCRIPTION OF THE DRAWINGS

FIGS. 4A, 4B, and 4C are timing diagrams illustrating the operation of an embodiment;

FIG. 5 is a block diagram of an embodiment of a circuit operating according to the timing diagram of FIGS. 4A to 4C;

DETAILED DESCRIPTION

Figure 1:
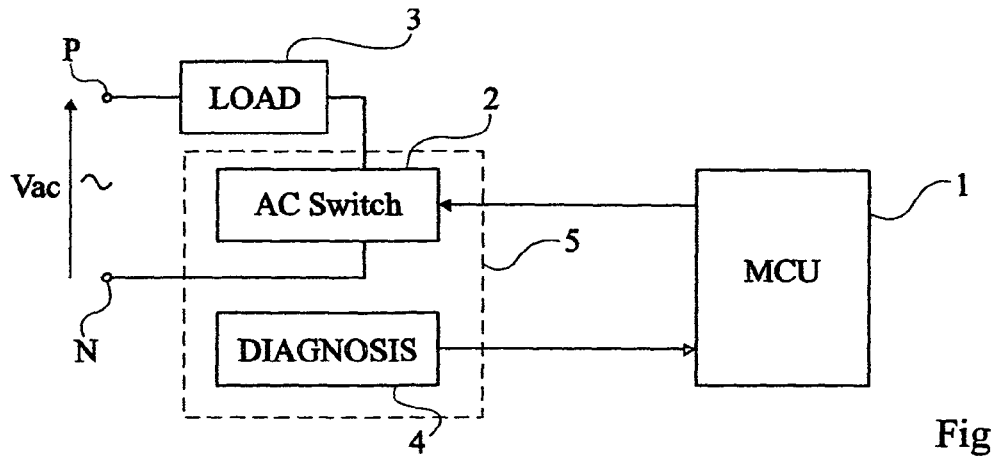
FIG. 1 is a block diagram of a system for controlling a load of the type to which the present invention applies as an example.

For clarity, same elements have been designated with the same reference numerals in the different drawings. The drawings have not been drawn to scale.

FIG. 1 is a block diagram of a system of the type to which the present invention applies as an example. A digital control circuit 1, for example, a microcontroller (MCU) is used to control at least one AC switch 2 (AC Switch) connected, for example, in series with a load 3 (LOAD) between two terminals P (for example, of a phase) and N (for example, of the neutral conductor) of an AC voltage Vac, for example, the main voltage. At least one circuit 4 (DIAGNOSIS) provides feedback or diagnosis regarding the state of the load and/or the state of the switch providing such information to control circuit 1. Generally, the switch is integrated with circuit 4 forming an interface (dotted lines 5) between MCU1 and load 3.

Figure 2:
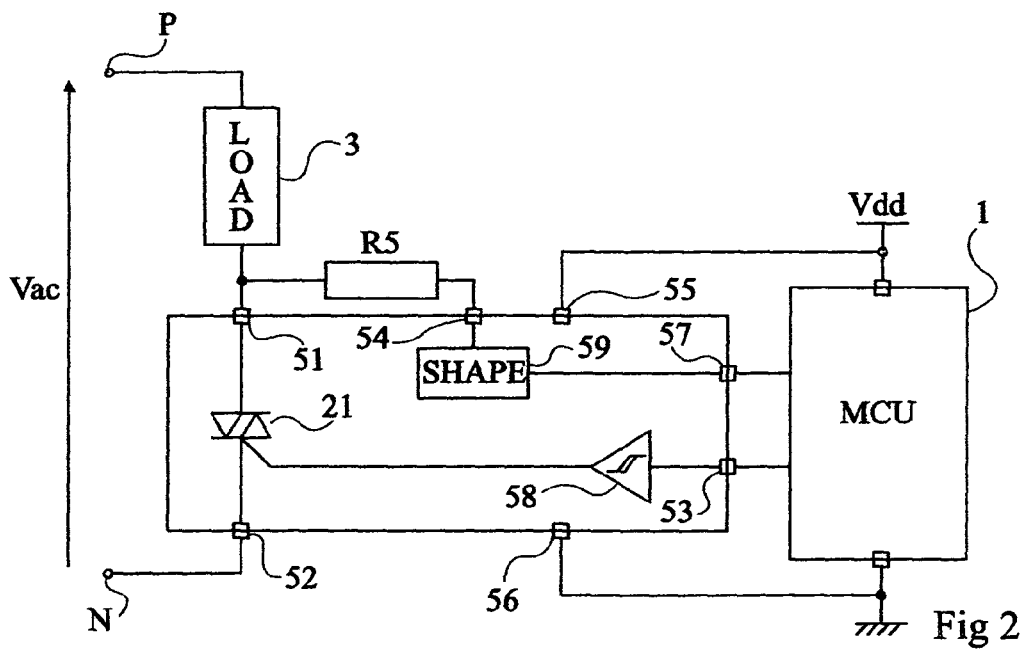
FIG. 2 shows an example of a usual circuit of interface between a load and a digital control circuit.

FIG. 2 is a more detailed block diagram of a usual example of an interface circuit 5 integrating an AC switch 21 with its interface to microcontroller 1. Circuit 5 integrates in this example a triac 21 forming the AC switch. The two conductors of triac 21 are connected to two terminals 51 and 52 of interface circuit 5 for coupling, on the one hand, to a terminal of load 3 and then terminal P and, on the other hand, to a terminal (for example, N). The voltage Vac is applied across terminals P and N. An additional switch (not shown) may be provided in the series association. The gate of triac 21 is connected at the output of an amplifier 58 having its input connected to a terminal 53 of circuit 5 for connection to an output terminal of microcontroller 1. Amplifier 58 especially has the function of performing a voltage-to-current conversion for the triac control. The information as to the state (conductive or not) of the triac is here obtained by means of a resistor R5 (or of a resistor network) having one end connected to terminal 51 and load 3 and having its other end connected to a feedback input terminal 54 of interface circuit 5. Terminal 54 is connected to a shaping circuit 59 (SHAPE) having its output connected to a terminal 57, which is an input to MCU circuit 1. Circuit 5 further comprises two terminals 55 and 56 of application, respectively, of a positive DC voltage Vdd and of a reference voltage (typically, the ground). In the shown example, voltage Vdd corresponds to the supply voltage of microcontroller 1.

Interface circuit 5, shown in FIG. 2, requires seven external terminals (e.g. 51-57). Now, the tendency to miniaturize circuits requires decreasing the number of external terminals of such a circuit.

An example of an application of the present invention relates to the control of a motor where circuit 1 exploits feedback signals to adjust the control.

An example of another application of the present invention relates to the control of a drain pump with a detection of the failure of a triac in diode mode.

Another example of an application of the present invention relates to the control of a solenoid valve, of a distributor, or of the locking of the door of a domestic device (washing machine, oven, etc.) with a status signal to confirm the security.

A further example relates to the control of heating elements or of lamps with a status signal for security.

Figure 3:
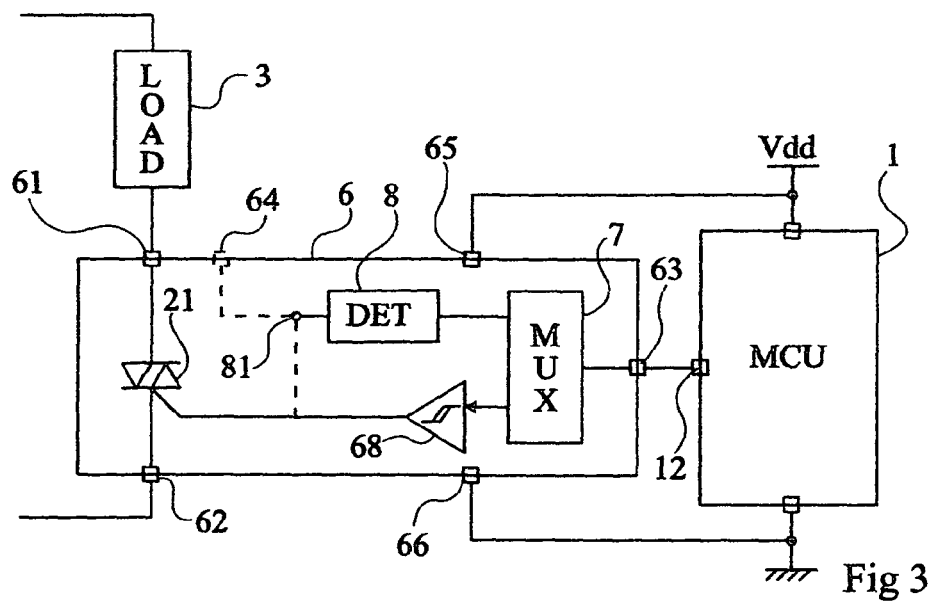
FIG. 3 is a block diagram of an embodiment.

FIG. 3 is a block diagram of an interface circuit 6 according to an embodiment of the present invention. As compared with the circuit of FIG. 2, a difference is that a single terminal 63 is used to communicate with circuit 1. A multiplexing circuit 7 (MUX) is interposed between this terminal 63 and, on the one hand, an amplifier 68 (or another circuit for shaping the control signals) towards switch 21 and, on the other hand, a detection or feedback circuit 8 (DET). The function of circuit 7 is to select the path (upward or downward) for connection to terminal 63. Circuit 8 has one or several input terminals 81 connected (connections in dotted lines to show that these are alternatives), either to one or several external terminals 64 for inputting signals of measurement of the state of load 3, or to one or several internal terminals (e.g. at the conductor coupling the output of amplifier 68 to the input of AC switch 21. The input to AC switch 21 can be provided with an analog output of a current or temperature detection element, etc. In the case of a status signal coming from the outside, terminal 64 is for example connected to the midpoint of a voltage dividing bridge connected across the load. In addition to terminal 63 (and possibly terminal 64), the interface circuit has two terminals 65 and 66 of application of a supply voltage Vdd (for example, microcontroller supply voltage Vdd) and two terminals 61 and 62 for connection of the conduction terminals of switch 21.

FIGS. 4A, 4B, and 4C illustrate timing diagrams in accordance with an embodiment of the present invention. FIG. 4A shows an example of the shape of AC voltage Vac. FIG. 4B shows an example of current Iac in the load. A purely resistive load is assumed, so that the current is not phase-shifted with respect to the voltage. The present invention is however not limited to resistive loads. FIG. 4C illustrates an implementation of the present invention.

According to this example, advantage is taken of the use of an AC switch of bistable type, that is, triggerable by application of a control current or voltage and keeping its on-state until the conduction current flowing therethrough disappears. Such is the case for a triac, for a thyristor, and more generally for any switch which is bistable or made bistable. For such switches, one may define (FIG. 4C), with respect to the AC voltage half-period, control time ranges T (trigger) and read time ranges R, that is, during which no control signal is required from circuit 1 and which can thus be used for an information feedback towards the control circuit. The purpose of multiplexing circuit 7 (FIG. 3) is to perform the time division between ranges T and R.

FIG. 5 is a simplified representation of an exemplary embodiment implementing the time division. Multiplexer 8 is here illustrated by switches 71 and 72 individually controlled by a circuit 75 for detecting the zero crossings (ZC) of the AC supply voltage, switches 71 and 72 being never on at the same time. FIG. 5 also illustrates an input-output stage of the microcontroller (MCU), which comprises an analog-to-digital converter 15 for converting the analog signals received from feedback circuit 8 and amplifier 16, generally a three-state amplifier that can be set to a high-impedance state in a read mode of port 12. In this example, circuit 8 receives a signal (internal or external) on terminal 81 and exploits it by means of a level-adapter circuit formed by an operational amplifier 84 having its feedback comprising a resistor 85. The other input terminal of amplifier 84 is connected, for example, to ground. To simplify the exemplary illustration in FIG. 5, the supply terminals of circuit 6 have not been shown. Assuming that microcontroller 1 wants to have load 3 supplied, it provides a control signal (for example, a constant status signal) during the control time ranges which follow each zero crossing of voltage Vac (or of the current in switch 21 in case of a non purely resistive load 3). The microcontroller obtains the required information on switching of its input-output terminal 12, for example, from zero crossing detector 75. This embodiment is more specifically intended for the case where the AC switch is only controlled in on/off mode, microcontroller 1 being a slave of the power circuit which provides it with information as to the zero crossings. The interface circuit is thus the control master. This embodiment requires for a terminal of the microcontroller to receive the information about the zero crossings. This is not necessarily disturbing, especially if said information is anyway required to organize the control.

Figure 6:
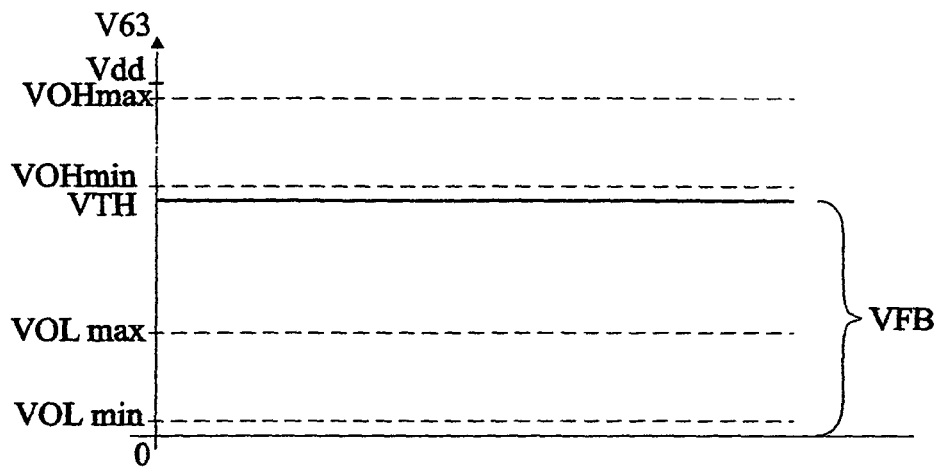
FIG. 6 is a diagram illustrating the operation of another embodiment.

FIG. 6 illustrates a diagram taking advantage of the operation of an input-output port of a microcontroller providing digital signals. This drawing shows the voltage ranges used by the microcontroller in input and in output mode.

In a digital control, the microcontroller signals are interpreted according to a high or low state. The high or low states correspond to voltage ranges respectively close to level Vdd and to the ground, within which the digital switches switch from one state (on or off) to another. The voltage ranges are defined by their maximum levels VOHmax, VOLmax and minimum levels VOHmin, VOLmin. The range between levels VOLmax and VOHmin is not used for control. Conversely, for reading (input-output port 12 in input mode), the entire range between the ground and level Vdd is exploitable by the microcontroller (for example, at the input of analog-to-digital converter 15).

According to this embodiment, the range of voltages likely to be provided to the microcontroller by detection circuit 8 is comprised between the ground and a threshold VTH lower than level VOHmin. It is then possible, for the microcontroller, to be the master of control periods without requiring knowledge of the zero crossings of voltage Vac. When microcontroller 1 wants to turn on switch 21, it provides a signal greater than level VOHmin (and thus greater than level VTH). Direction selection circuit 7 detects the reception of a signal greater than the threshold and then provides the control signal to amplifier 68. Outside the control time ranges, the microcontroller places its port 12 in read mode (amplifier 16 in high-impedance mode). Further, the provision of a control signal to amplifier 68 prevents, in circuit 7, the connection between the detector and terminal 63. Accordingly, terminal 63 is by default in read mode and is switched to the control mode as soon as a switch turn-on order is present. The detection of the low level (between VOLmin and VOLmax) is not useful on the interface circuit side since switch 21 automatically turns off. The voltage range VFB exploitable in read mode ranges between the ground and threshold VTH.

Another benefit of this embodiment is that the control is independent from a detection of the zero crossings and is thus compatible with a phase angle control.

Another benefit is that the microcontroller is the master of the transmission.

Figure 7:
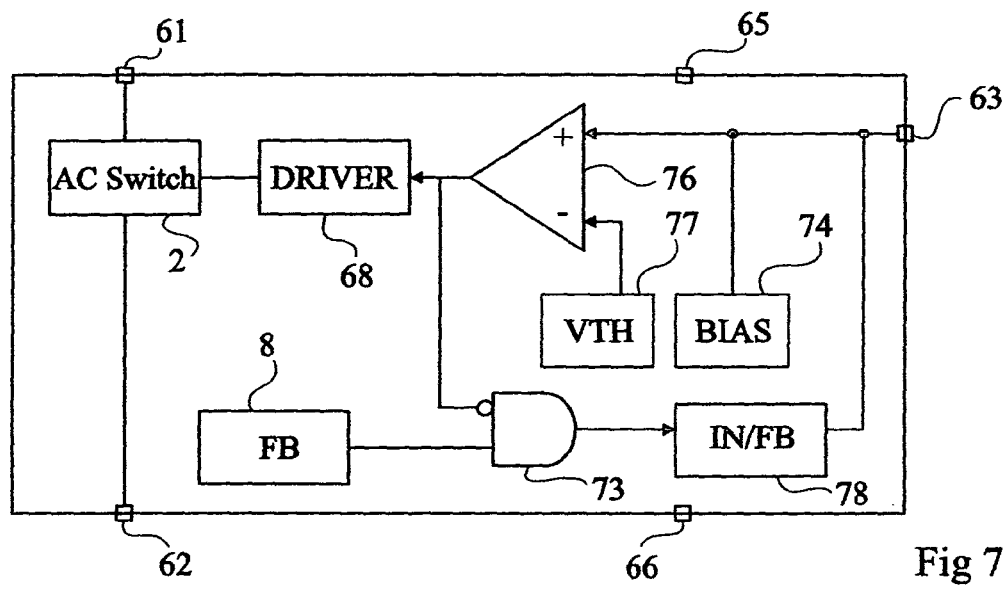
FIG. 7 is a functional block diagram of an embodiment of an interface circuit operating according to the diagram of FIG. 6.

FIG. 7 is a block diagram of an embodiment of a circuit operating in accordance with the diagram of FIG. 6. The FIG. 7 embodiment integrates AC switch 2 (AC Switch), its amplification circuit 68 (DRIVER), and feedback circuit 8 (FB). The setting of circuit 8 may originate from inside or from outside of the illustrated circuit. A comparison element 76 compares the signal of terminal 63 with a reference voltage 77 (VTH) and conditions the provision of this signal to amplifier 68. The signal is only provided to circuit 68 if it is greater than level VTH, and thus represents an instruction for controlling the switch turn-on. The output of comparator 76 is further connected to a first inverted input of an AND gate 73. AND gate 73 receives a second input from the feedback signal originating from circuit 8. The output of gate 73 is sent onto a block 78 (IN/FB) having its output connected to terminal 63 to feed the signal back to the digital control circuit (not shown in the Figure). Further, a biasing element 74 (BIAS) sets a maximum level (lower than level VTH) at terminal 63, block 78 varying this biasing during read time ranges. Comparator 76 also performs an impedance matching between the circuit (for example, MCU 1 not shown in this Figure) connected to terminal 63 and amplifier 68. The comparator preferably is a comparator with a hysteresis around threshold VTH for steadiness reasons.

Figure 8:
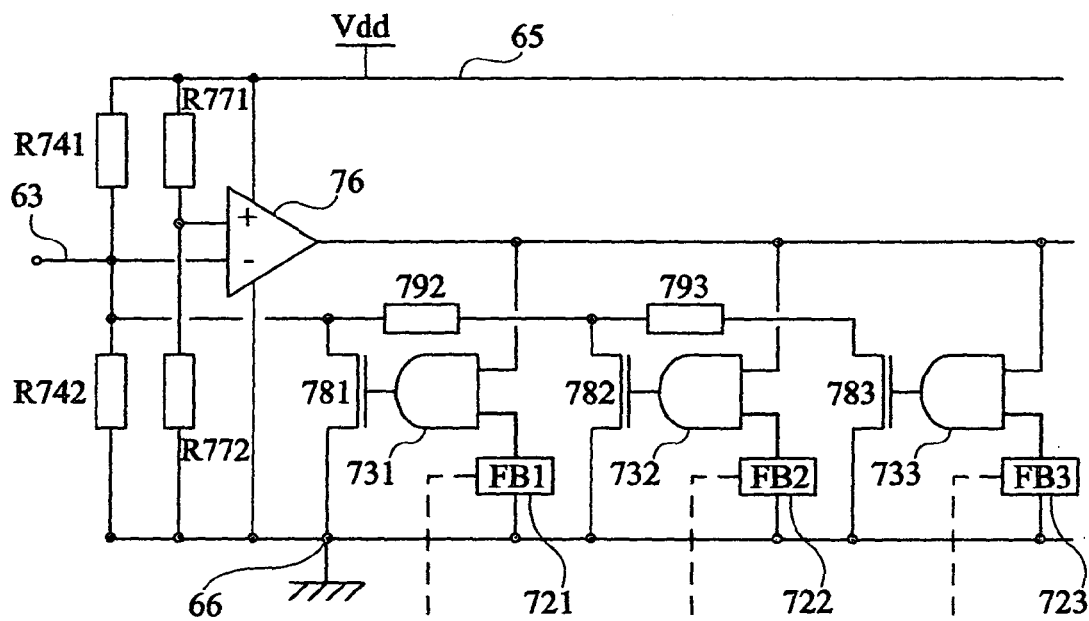
FIG. 8 shows another example of a first portion of an interface circuit according to the embodiment of FIG. 6.

FIG. 8 is a more detailed diagram of an example of a control portion of the circuit of FIG. 7. In this example, three DC diagnosis or feedback signals are likely to be exploited. This functionality has been illustrated by three blocks 721, 722, and 723, each providing a voltage in all or nothing to AND-type gates 731, 732, and 733 having their second respective inputs connected to the output of comparator 76. Biasing 74 at terminal 63 is obtained by a resistive dividing bridge which is formed of two resistors R741 and R742 in series between the two terminals of application of voltage Vdd. Threshold voltage VTH is obtained by a resistive dividing bridge which is formed of two resistors 771 and 772 in series between these terminals of application of voltage Vdd. For example, the junction point of resistors R771 and R772 is connected to a non-inverting input (+) of comparator 76. The junction point of resistors R741 and R742 is connected to the inverting input (−) of comparator 76 and to terminal 63. This embodiment illustrates a variation in which the inputs of comparator 76 are inverted with respect to the embodiment of FIG. 7. This amounts to an inverted turn-on control of the switch. In this example, the output signal of comparator 76 is not inverted for application on gates 731, 732 and 733. The respective outputs of gates 731, 732, and 733 control switches (for example, MOS transistors 781, 782, and 783) having a first conduction terminal connected to ground. The second conduction terminal of transistor 781 is connected to terminal 63 directly or via a resistor (not shown). When FB1 detector 721 is activated and the output of comparator 76 is in the high state, transistor 781 is turned on, which modifies the voltage level of terminal 63. This level is then interpretable by microcontroller 1, which has placed its port 12 (see. FIG. 3) in read mode. The second conduction terminal of transistor 782 is coupled to that of transistor 781 by a resistor 792 and a second conduction terminal of transistor 783 is coupled to that of transistor 782 by a resistor 793. The turning-on of transistor 782 or 783 modifies the value of resistive bridge 741-742, and thus the voltage level of terminal 63. The number of usable detectors especially depends on the input sensitivity of microcontroller 1.

Figure 9:
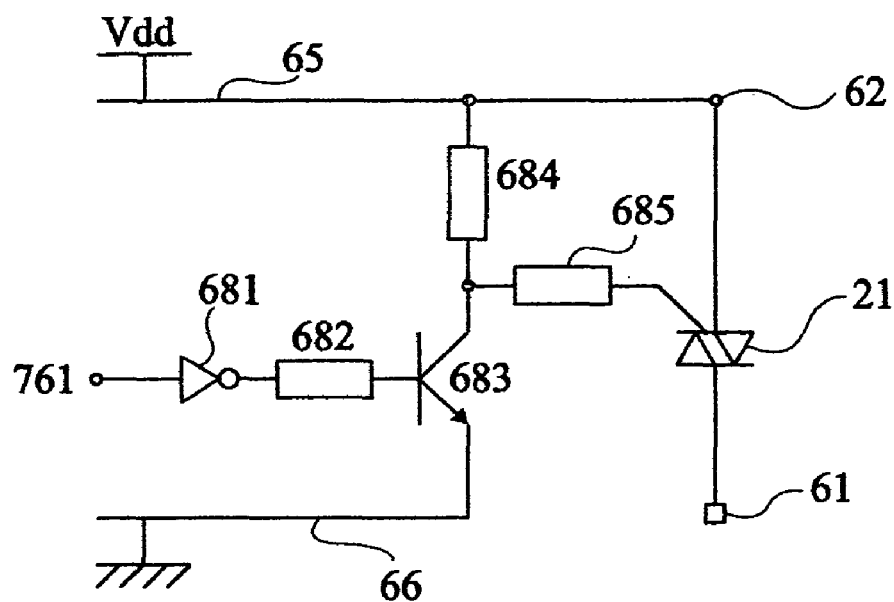
FIG. 9 shows an example of a second portion of the circuit of FIG. 8.

FIG. 9 shows a first embodiment of driver circuit 68 (see FIG. 7) for controlling AC switch 21. The output of comparator 76 at terminal 761 is connected by an inverter 681 (required or not according to whether the active state of the control signal is high or low) in series with a biasing resistor 682 to the base of an NPN-type transistor 683 having its emitter connected to ground and having its collector connected by a resistor 684 to conductor 65 which is the conductor supplying AC voltage Vdd. The junction point of transistor 683 and of resistor 684 is connected by a resistor 685 to the gate of the AC switch, e.g. triac 21. A first conduction terminal of the triac is connected to terminal 62, which thus corresponds, in this embodiment, to one of the terminals of application of the AC voltage Vdd, while the other terminal 61 is connected to the load (not shown). This example relates to the case where one of the AC voltage terminals corresponds to the high potential of DC power supply Vdd.

Figure 10:
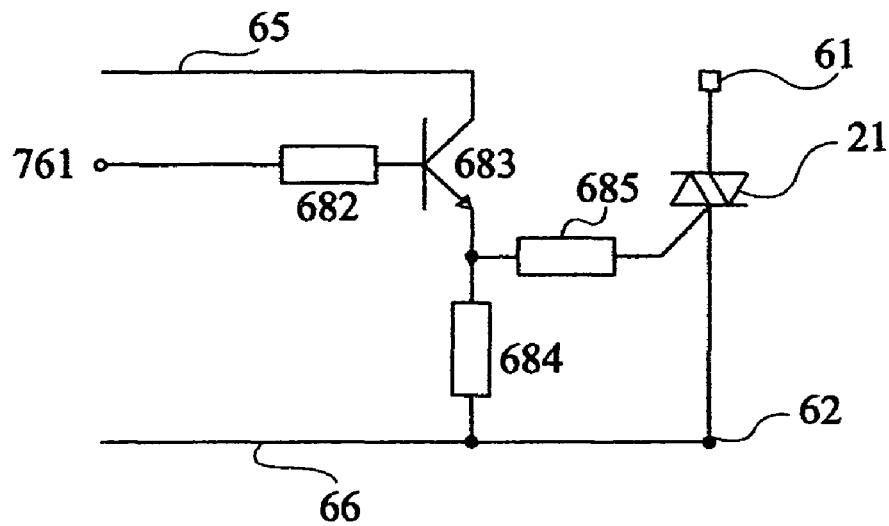
FIG. 10 shows another example of a second portion of the circuit of FIG. 8.

FIG. 10 shows another example of a driver circuit 68 in which the output of comparator 76 at terminal 761 is connected by resistor 682 to the base of an NPN-type transistor 683. The collector of transistor 683 is connected to cpncuctor 65. The emitter of transistor 683 is grounded by a resistor 684. This emitter is also connected by a resistor 685 to the gate of the AC switch, e.g. triac 21. Triac 21 has one of its conduction terminals connected to ground conductor 66, corresponding to the neutral of the AC power supply. The other conduction terminal of triac 21 is connected to terminal 61 and the load (not shown).

The examples of FIGS. 9 and 10 illustrate cases of non-isolated controls. Additional galvanic isolation elements may be provided.

Another benefit of the present invention is that the performed time division enables sparing a terminal on the interface circuit.

Another benefit is that this interface circuit is compatible with all usual applications of an AC control circuit.

The time period ratio between control and read ranges T and R depends on the application, and especially on the required control time period. For example, for a phase angle control, time period T is selected according to the range of phase angles required for the control. Further, the entire period T is not necessarily exploited (which is the case, for example, for a pulse control). Further, the time positions of ranges T and R with respect to the zero of voltage Vac may be adapted, for example, according to the type of load (resistive, inductive, etc.), where range R may then be divided in two if only one half-period is considered (before and after range T).

Specific embodiments of the present invention have been described. Various alterations and modifications will occur to those skilled in the art. In particular, although it has been described in relation with a triac, the present invention also applies to the control of a thyristor or of any AC switch, bistable by nature or made bistable. Further, the present invention is compatible with usual interpretations of detection signals provided in the form of voltage levels to a microcontroller or any other control and interpretation circuit. Further, the values to be given to the different voltages and thresholds depend on the application and are within the abilities of those skilled in the art based on the functional indications given hereabove. Finally, all that has been described in relation with DC Vdd and ground potentials defines relative levels between these potentials which may indifferently be positive or negative with respect to earth.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An interface circuit between at least one switch adapted to apply an AC signal to a load and a control circuit, comprising:
    at least one time multiplexing circuit adapted to provide an information signal to a single terminal of the control circuit in a time multiplexing with a control signal of the switch, the time multiplexing circuit having at least one element for comparing the voltage present on said single terminal with a threshold beyond which the control signal is transmitted to the switch.

2. The circuit of claim 1, wherein the multiplexing circuit comprises a circuit for biasing said single terminal to a level lower than said threshold (VTH).

3. A circuit for controlling a load to be supplied with an AC voltage, comprising: at least one circuit as claimed in claim 2.

4. The circuit of claim 1, wherein at least one information provision circuit is capable of, in the active state, lowering the biasing level of said single terminal).

5. A circuit for controlling a load to be supplied with an AC voltage, comprising: at least one circuit as claimed in claim 4.

6. A circuit for controlling a load to be supplied with an AC voltage, comprising: at least one circuit as claimed in claim 1.

7. An interface circuit as in claim 1, further comprising:
    an amplifier electrically coupled between said at least one multiplexing circuit and said at least one switch.

8. An interface circuit as in claim 7, wherein said at least one multiplexing circuit comprises:
    first and second switches, each having a conducting and a non-conducting state electrically coupled to said single terminal; and
    a detection circuit electrically coupled to an input of said first and second switches for selectively activating said first and second switches such that only one of said two switches is in a conducting state at any one time;
    said detection circuit being adapted to receive an AC signal alternating between positive and negative states and changing the conducting state of a selectively activated switch in response to said AC signal crossing from one of the positive or negative states to the other.

9. An interface circuit as in claim 8, wherein said at least one multiplexing circuit further comprises:
    a uni-directional connection for providing an input signal to said digital controller, said input signal indicating which one of said two switches has been activated into a conducting state.

10. An interface circuit as in claim 8, wherein:
    a full cycle of said AC signal includes a half cycle in the positive state and a half cycle in the negative state and at least one of the half cycles includes a trigger state and a read state, wherein an output signal is provided to the input of said AC switch only during the trigger state of the AC signal.

11. A bidirectional connection between a digital control circuit and an AC switch comprising:
    a multiplexing circuit electrically coupled to the digital control circuit solely through a single terminal;
    said multiplexing circuit having first and second switches, each having a conducting and a non-conducting state electrically coupled to said single terminal;
    a detection circuit electrically coupled to an input of said first and second switches for selectively activating said first and second switches such that only one of said two switches is in a conducting state at any one time;
    said detection circuit being adapted to receive an AC signal alternating between positive and negative states and changing the conducting state of a selectively activated switch in response to said AC signal crossing from one of the positive or negative states to the other;
    an AC switch having an input electrically coupled to an output of said multiplexing circuit for receiving a control signal from said multiplexing circuit and an output adapted to be directly connected to a load; and
    an amplifier electrically coupled between said multiplexing circuit and said AC switch.

12. A bidirectional connection between a digital control circuit and an AC switch as in claim 11 wherein said multiplexing circuit further comprises:
    a uni-directional connection for providing an input signal to said digital controller, said input signal indicating which one of said two switches has been activated into a conducting state.

13. A bidirectional connection between a digital control circuit and an AC switch as in claim 11, wherein:
    a full cycle of said AC signal includes a half cycle in the positive state and a half cycle in the negative state and at least one of the half cycles includes a trigger state and a read state, wherein an output signal is provided to the input of said AC switch only during the trigger state of the AC signal.

14. A method for controlling a switch adapted to supply an AC signal to a load comprising the steps of:
generating a control signal by a first circuit;
supplying said control signal to a single terminal of a second circuit, adapted to control the switch;
detecting an information signal as to the state of the switch or of the load to which the switch is adapted to supply an AC signal; and
providing the detected information signal to said single terminal in a time multiplexing with said control signal;
the information signal being provided to said single terminal during time phases when no control signal is applied on this terminal.

15. The method of claim 14, wherein:
the control signal is applied to said single terminal during a first time phase of each half-period of an AC signal; and
the information signal is provided to said single terminal during a second phase of each half-period of the AC signal.

16. The method of claim 15, wherein the duration and the position of the first time phase is selected according to the control signal and/or to the type of load.

17. The method of claim 16, wherein the first time phase starts at voltage zero of an AC voltage (Vac) for supplying the load controlled by the switch and ends at a time selected for the current in the switch to be sufficient to maintain it in the on state until the end of the half-period.

18. The method of claim 14, wherein a range of possible voltages of the information signal is selected to be below a minimum level (VOHmin) of the control signal.

* * * * *